US007082446B1

(12) United States Patent
Bottomley (10) Patent No.: US 7,082,446 B1
(45) Date of Patent: Jul. 25, 2006

(54) HYBRID TRANSACTION/INTENT LOG FOR DATA REPLICATION

(75) Inventor: James E. J. Bottomley, Oswego, IL (US)

(73) Assignee: Steel Eye Technology, Inc., Palo Alto, CA (US)

( * ) Notice: Subject to any disclaimer, the term of this patent is extended or adjusted under 35 U.S.C. 154(b) by 430 days.

(21) Appl. No.: 10/122,163

(22) Filed: Apr. 15, 2002

(51) Int. Cl.
*G06F 17/30* (2006.01)

(52) U.S. Cl. .............................. 707/204; 707/1; 707/10; 714/5; 714/16

(58) Field of Classification Search ................ 395/444, 395/600, 182.03; 707/204
See application file for complete search history.

(56) References Cited

U.S. PATENT DOCUMENTS 5,440,727 A * 8/1995 Bhide et al. ................. 711/117
5,819,020 A * 10/1998 Beeler, Jr. ..................... 714/5
5,956,489 A 9/1999 San Andres
6,092,066 A 7/2000 Offek
6,163,856 A 12/2000 Dion
6,260,125 B1 7/2001 McDowell

OTHER PUBLICATIONS

T Haderer and A Reuter "Principles of Transaction-Oriented Database Recovery" Computing Surveys vol. 15 No. 4 pp. 287-317.

* cited by examiner

*Primary Examiner*—Charles Rones
*Assistant Examiner*—Belix M. Ortiz (57) ABSTRACT

A method whereby a transaction log is converted to an intent log and vice versa while the replication system is operating, thus allowing the replication system to operate primarily as a transaction log, but switch eventually to an intent log before an overflow condition of the transaction log occurs. The size of the hybrid log is tuned so that it remains a transaction log (with all the benefits) for commonly occurring small network outages but will convert to an intent log (and thus not overflow) if a prolonged outage occurs.

6 Claims, 6 Drawing Sheets

HYBRID TRANSACTION/INTENT LOG FOR DATA REPLICATION

BACKGROUND OF THE INVENTION

The present invention relates generally to the art of synchronising copies of data in real time between dispersed computer systems. The technique is applicable whether the computers are dispersed over large distances, replicating over short local networks, or even to a single computer utilising a RAID-1 subsystem.

In the field of reliable computing, one particular need is to keep a duplicate or backup copy (called a replica) of a particular data set in such a way that the replica is always an exact (or just slightly out of date) copy of the primary data set. In a synchronous replication environment, the replica is always exact; in an asynchronous one, the replica may be out of date with respect to the primary by at most a predetermined amount.

Figure 1:
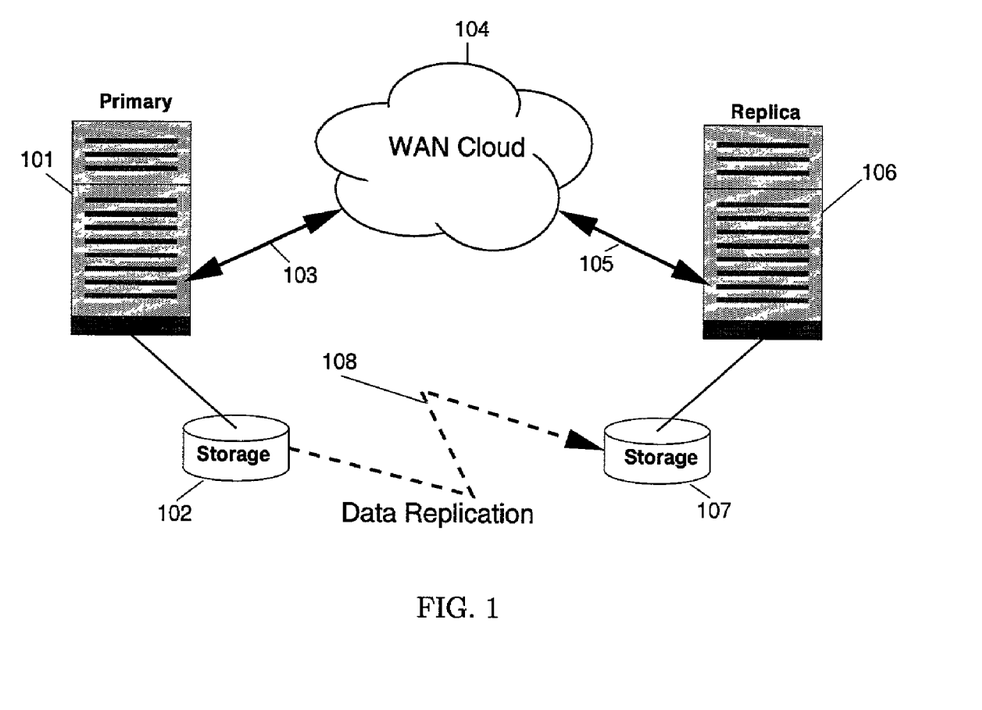
FIG. 1 shows a standard set up where the primary replicates its data set to a replica over the internet.

FIG. 1 illustrates a replication set up having a primary 101, with its associated data set on permanent storage 102, which is connected to a network 103. Network 103 is routed onto the internet 104 which ultimately connects to a different network 105. The replica 106 also having a storage device 107 for receiving a replica of the data set and being connected to network 105. Thus, a write to the data set on the primary storage 102 may be encapsulated into a network datagram and sent over networks 103, 104 and 105 where it is received at the replica, unencapsulated and sent down to the replica data set on storage 107. This operation is functionally equivalent to direct replication 108 from the primary data set on 102 to the secondary data set on 107.

When a communications failure occurs between the primary and its replica, the primary continues processing the data set but the replica is frozen until it can re-establish communications with the primary. When communications are re-established, the replica must be brought up to date again (preferably without too much impact to the primary). Since the data set being processed may be much greater than the data actually changed while the primary and replica lost contact, it is advantageous to transmit to the replica only the said changes necessary to bring it up to date with respect to the primary. There are two methods usually used for keeping track of the changes between a primary and its replica.

i. Transaction Logging

Every write made to the primary data set is recorded separately in an ordered log called the transaction log whose contents alone are sufficient to recreate the original write. The same write is also sent (if possible) to the replica. When the write completes on the replica, a signal is sent back to the primary and the primary then removes the log entry for the write from its transaction log (note, this removal of the log entry doesn't have to be done instantaneously). When contact with the replica is lost, the transaction log fills up because no completion signals are received. As soon as contact is restored, the transaction log can be replayed, in order, to the secondary (from oldest to youngest write); transactions may still be accepted while the replay is going on. The great advantage of using a transaction log is that while the log replay is in process, because it is sending every write in the correct order, the replica is always an exact (but out of date) copy of the primary. Thus, even if there is a failure during the log replay, the replica would still be usable as an (out of date) copy of the primary. The great disadvantage of a transaction log is that it must be a finite size. Further, since it records every transaction, three writes of a kilobyte each would occupy over three kilobytes in the transaction log since they must all be recorded in the correct order. Thus, a transaction log grows without bound when the primary is processing data but out of contact with the secondary. When a transaction log runs out of space, a condition called log overflow, the primary has no choice but to send its entire data set to the replica when contact is re-established. This may take a considerable amount of time and further, the replica is a corrupt copy of the primary until the resynchronisation is completed.

Obviously, the operator of the replication system must set the transaction log to a maximum finite size, so sizing the transaction log to avoid log overflow in most situations becomes an issue.

ii. Intent Logging

The concept of an intent log is predicated on the assumption that the dataset can be segmented into chunks (called clusters), which the replication system must also use as its basic unit of transmission. Often, the clusters correspond to indivisible quantities in the data set such as the file system block size, or the underlying disc sector size. When a write occurs on the primary, the number of clusters it covers is ascertained and these clusters are marked as dirty in a bitmap of clusters covering the entire data set (the intent log). When the write completion signal is sent back from the replica, the dirty bit is cleared from the intent log (this bit clearing doesn't have to be done instantaneously). If contact is lost with the replica, the intent log continues to keep a record of all the clusters dirtied. When contact is restored the log is replayed sending only the dirty clusters to the replica to update it. However, since the intent log contains no concept of ordering, the replica is corrupt until the replay is complete. The great advantage an intent log has is that it is a finite and known size and can never overflow. This property makes it particularly effective for geographically dispersed clusters, where the communications failures can be prolonged because of the distances and the sheer numbers of intermediate networks that must be traversed to copy data between the sites.

Note also that for a large outage an intent log replay is far more efficient than a transaction log since an intent log only replays a dirty cluster once but a transaction log may have to change the same cluster of data many times because it is mirroring exactly how the data changed in the primary volume.

BRIEF SUMMARY OF THE INVENTION

The object of the present invention is to produce a replication log that can replay transactions in order like a transaction log but that also never overflows, like an intent log. The present invention achieves this object by using a log which behaves as a transaction log until the log overflow condition occurs, whereupon it converts this transaction log to an intent log, replaying the complete transaction log through the intent log so that all of the correct clusters are marked dirty. The log will operate as an intent log from that point until a log replay has been completed, whereupon, the empty log will begin as a transaction log again.

The utility of the present invention lies in the fact that the user of the present invention may tune the log size to the anticipated communication outage patterns in their replication enterprise. Thus, for most small communication outages the log is big enough to remain as a transaction log for the entire outage and thus retain all the benefits of such a log. For a prolonged communications outage, the log will switch to an intent log and thus the log overflow problem is avoided (although the replica will now be corrupt on log replay).

Those skilled in the art will notice that most quality replication solutions also guard against corruption problems that may occur in the replication system because of a failure of the primary (so that replication may begin seamlessly when the primary failure is corrected). Therefore, it is a further object of the present invention to preserve the utility of the log at all times during its conversion from transaction to intent. This object is achieved by identifying the amount of space taken up by the intent log bitmap and adding to this the amount of space taken up by compressed transactions. All of the transactions within this space are compressed: the data contained in them is eliminated and instead the numeric identifiers of the clusters they cover in the primary dataset is substituted (this data is much less than the original transaction data). At this point, the transactions are labelled with their order (for transaction logs that use implicit ordering within the log for this). This process opens up spaces within the log where the eliminated data would have been. Compressed transactions that lie within the space that will become the intent log bitmap are now copied to the excess space identified to contain them. Finally, the intent log bitmap is cleared and all transactions (starting with the compressed ones) are replayed to set the dirty clusters in the intent log. Each step in this process is a logical checkpoint: if the process is halted, it can be restarted from the beginning of the step with no adverse consequences. Once conversion to an intent log has begun, it must be completed before the dirty clusters can be sent to the replica as part of log replay.

Those skilled in the art will notice that if the conversion is done only after the transaction log becomes full, all writing to the data set must be suspended while the conversion to an intent log is in progress to preserve the integrity of the log. However, if the conversion were begun speculatively while some space remained in the transaction log, writing to the data set (and logging to the end of the transaction log) could continue as long as both the transaction log has space and the conversion routine is aware of the added transactions and processes them correctly. Thus, by correct choice of this conversion point, the processing of the data set may continue uninterrupted.

Those skilled in the art will appreciate that the compression method will still function even if the transaction header and body for an individual transaction entry are not contiguous in the log. In this case the intent log region would be set up so as to span mainly the bodies of the transactions.

DETAILED DESCRIPTION OF THE INVENTION

The preferred embodiment is presented in terms of a network replicating system because that is where the present invention has the greatest utility. However, those skilled in the art will realise that nothing prevents the principles disclosed from being applied to a single computer system replicating data between two locally connected volumes.

Figure 2:
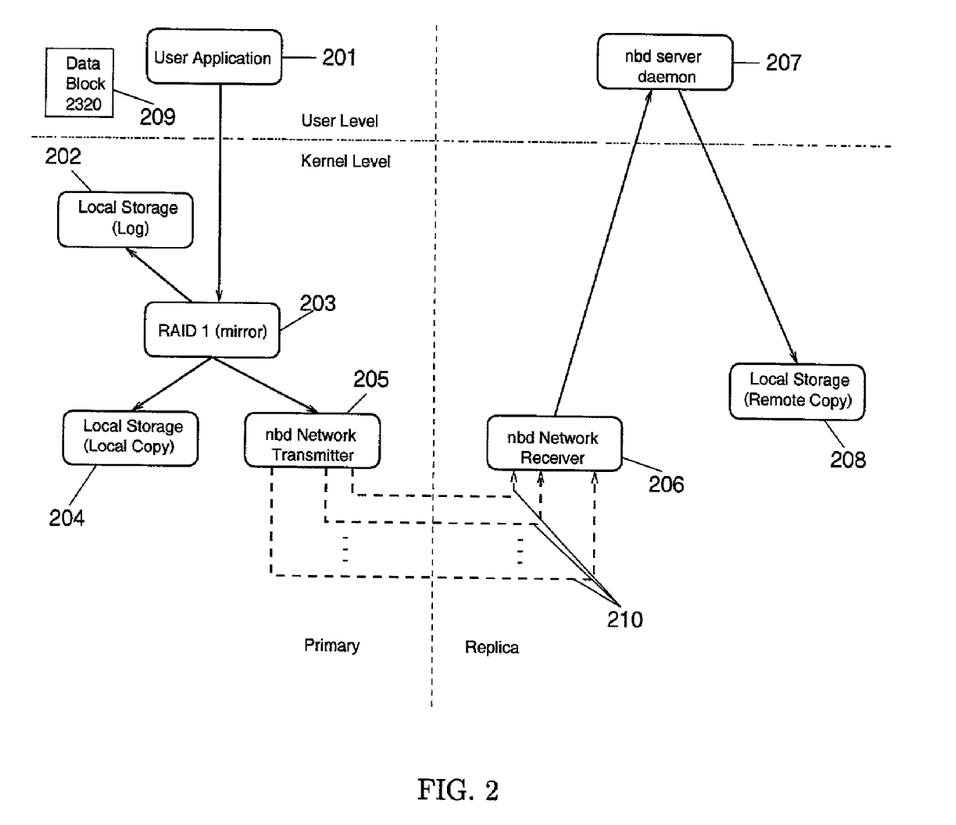
FIG. 2 shows a block diagram of the preferred embodiment in the Linux operating system using a modification to the md and nbd drivers of the Linux kernel.

A preferred embodiment for the invention consists of a RAID-1 device (in Linux this would be the md driver) and a Network Block Device (in linux this is nbd) whose job is to appear to the primary as a local device, but which in fact hands off all reads and writes to a block device physically located on the replica. Such a set up is illustrated in FIG. 2. User application 201 sends a write of data block number 2320 (illustrated as 209) down to a device connected to RAID-1 mirror 203. Mirror 203 logs the write in log 202 and after it receives a write completion signal from log 202, sends it down to local storage 204 and the nbd network transmitter 205. Transmitter 205 packages the data up for the network and sends it over one or more network paths 210 to receiver 206 which unpackages the data, sends it to daemon 207 which finally puts the data on replica storage 208. The write complete signal from committing the data to storage 208 is transmitted back to daemon 207 and then receiver 206 which transmits the signal back over the network to 205. 205 then sends a write completion signal to mirror 203. On receipt of completion signals from both local copy 204 and the remote copy 208, mirror 203 erases the log entry for the particular data block and sends a write completion signal to the user application 201.

When log 202 is functioning as an intent log, it simply writes a dirty bit corresponding to data block 209; when it is functioning as a transaction log, it records sequentially an entire copy of the data.

Figure 3:
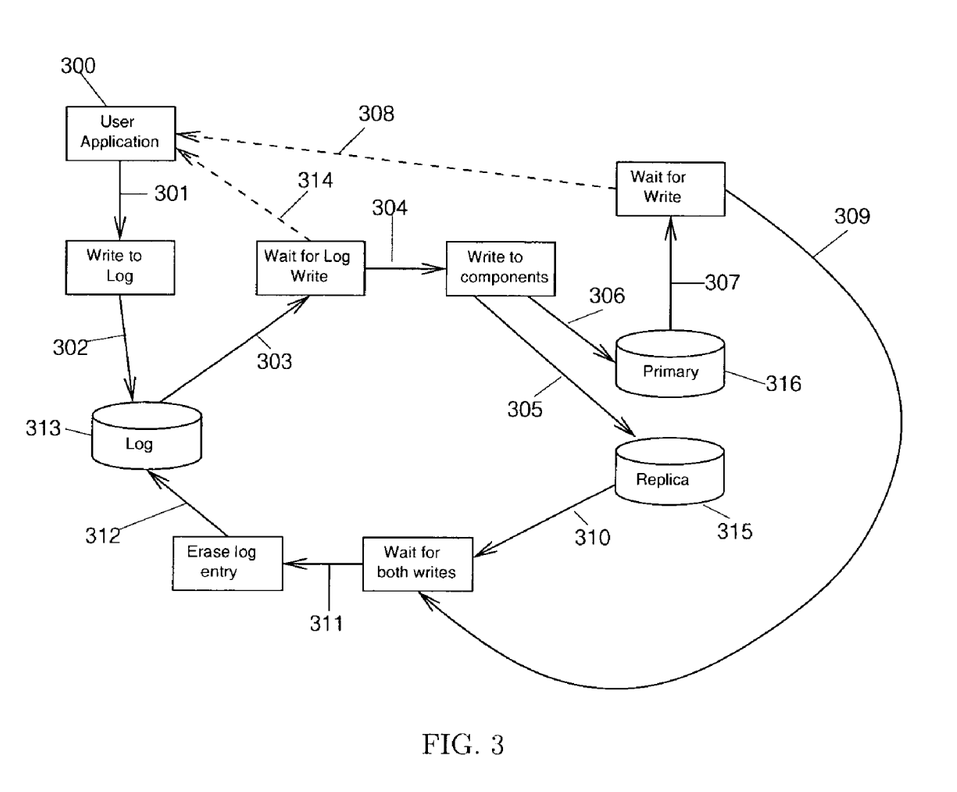
FIG. 3 shows the flow of actions through an asynchronous intent or transaction logging system.

FIG. 3 illustrates the sequence of events for an asynchronous replication system. User Process 300 issues a write 301 to the replication system. The write 301 is first directed 302 to Log 313 (where it is recorded either as a dirty bit for an intent log or complete data for a transaction log). Write completion of the log 303 triggers the system 304 to issue the same data as both a write 306 to primary volume 316 and a write 305 to replica volume 315. A write completion signal 307 from the primary volume 316 causes a write completion signal 308 to be returned to the user process. The foregoing actually describes the case for an intent log; for a transaction log, the alternate write completion signal 314 is returned to the user immediately after the write completion 303 from the log 313 is returned. At this point, the user process believes the write transaction to be completed. The following is unnecessary to the user process, but may be done if the primary and replica are in good network contact: once write completion signals 309 and 310 from the primary 316 and replica 315 volumes respectively are processed, they trigger 311 the log entry to be erased 312. If this process cannot be completed because the primary and replica are out of contact, the log entry remains until a log replay occurs.

Figure 4:
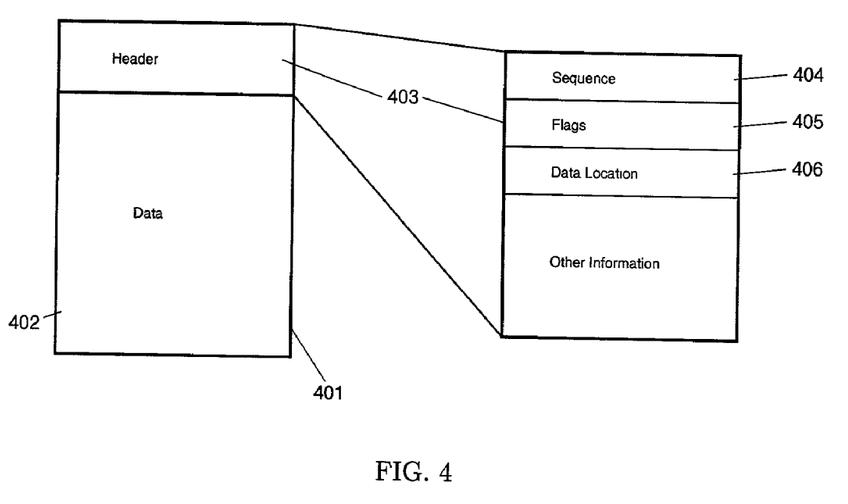
FIG. 4 shows a schematic of the composition of an individual transaction that resides inside the transaction log.

The present invention requires that the log 313 initially be a transaction log, but should log write 302 fill the log up to a pre-specified level (which may be completely full, or a fraction thereof), the conversion of the log to an intent log shall begin. A transaction entry in the log is illustrated in FIG. 4. The transaction entry 401 consists of a header 403 which is quite small (usually under 16 bytes) and a body 402 containing the data. Since data is usually written by the operating system in indivisible units of blocks which are at least 512 bytes long, many transaction headers 403 would fit inside a single transaction body 402. The header itself consists of a sequence number 404 identifying the correct ordering for the transaction, a set of flags 405 identifying the state of the transaction and data location information 406 identifying where data 402 should be placed in the replica volume to complete the transaction.

Figure 5:
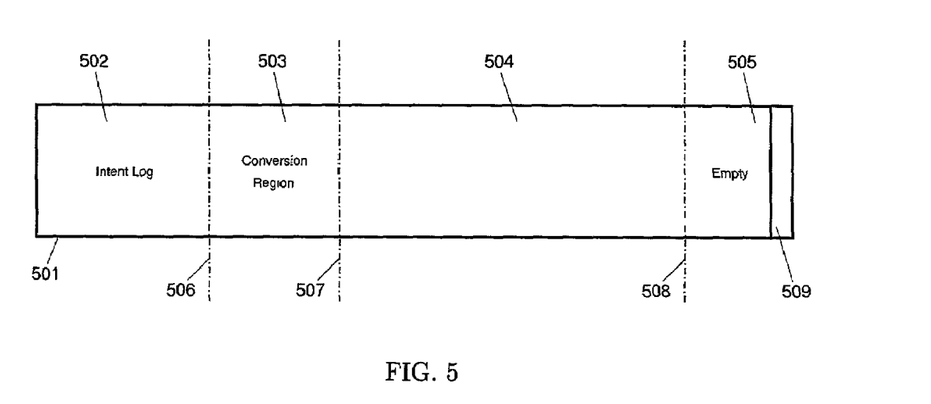
FIG. 5 Shows the layout of the log functioning currently as a transaction log but sliced into regions for conversion to an intent log.

In FIG. 5, the actual transaction log 501 is divided into regions prior to conversion to an intent log. Region 502 bounded by 506 represents the actual space that would be taken up by the intent log. The size of this region in bytes is calculated by taking the number of clusters on the device and dividing it by 8 (one dirty bit per cluster). It is usually rounded up to the nearest device block to avoid synchronization complexities caused by sharing indivisible regions on the said device. Boundary 506 may occur inside a transaction body, but may not occur inside a transaction header. The next region 503, called the "conversion region" is the amount of space set aside for compressed transactions inside the intent log. First, the compressed transaction space requirement is calculated by counting the number of transactions inside region 502, multiplying by the transaction header size. Then, boundary 507 is set by counting up the space taken by the number of transaction bodies (excluding the headers) from region 502. When this equals the compressed transaction space requirement, the barrier 507 is assigned to the next block boundary that doesn't reside inside a transaction header. Boundary 508 marks the point at which conversion to an intent log will begin this quota of unfilled space in the transaction log is exceeded (note that a transaction log may not necessarily be contiguous, so the empty region 505 may be spread across the log rather than located neatly at the end. This only affects how the conversion point is found, not the algorithm for converting to an intent log). Field 509 right at the end of the log is a flag field identifying the log either as type TRANSACTION, type INTENT or type CONVERTING.

The conversion process then proceeds according to the following steps:

1. Set the log type to CONVERTING.
2. All transactions in the conversion region 503 are "compressed". The process of compressing the transactions is simply to add the flag COMPRESSED to the transaction header. The presence of this flag indicates to any routine using the transaction log that it may no longer rely on the data 402 in the transaction entry, but must instead use the data location 406 of the transaction header to read the data from the primary volume instead.
3. All transactions in the intent log region 502 are moved to the available space previously occupied by the data pieces of the transactions in the conversion region 503 in the following fashion
   (a) Copy the next individual transaction header to the first available piece of space in the empty data areas of the conversion region 503, marking the transaction as COMPRESSED in the new header.
   (b) Once the copy is complete, erase the header from the intent log by marking its flags as INVALID.
   (c) Repeat until the intent log region 502 is empty.
4. Completely clear the intent log region 502.
5. Begin to move up the transaction log from boundary 506 to the end of the log reading the log headers and using data location information 406 to set the dirty bits in the intent log 502. Note: this sweep does not have to be done in transaction sequence 404 order.
6. Once the sweep is complete, and any transactions that may have been placed into the empty region are converted, the log type is switched to INTENT and all writes now merely set the dirty bits in the appropriate region of the intent log.
7. All of the transaction log excluding the intent log region 502 (and the flag 509) are cleaned out to contain no transactions in preparation for beginning life again as a transaction log when the intent log replay to the replica has completed.

Should the primary crash at any point while the log is of type TRANSACTION or INTENT, only actions that usually apply to those log types need be taken. However, if the crash occurs while the log is of type CONVERTING, the conversion must be completed. Since all of the actions in the list above are idempotent, the conversion may simply be restarted from step 2 in the list.

Figure 6:
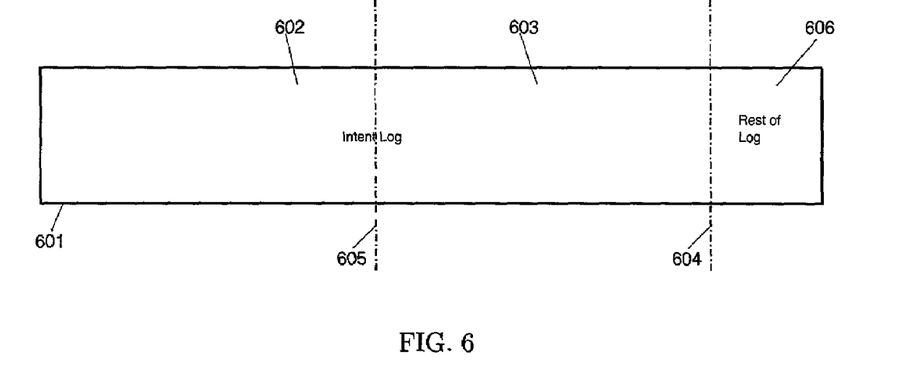
FIG. 6 Shows the log functioning as an intent log during a replay to the replica system.

If the conversion to intent log has occurred (or conversion has begun) when the replica comes back into contact with the secondary, replay of the log must be done as an intent log. During the replay of the intent log, a moving point, called the synchronisation point is maintained. This point starts at the beginning of the intent log 502 and moves sequentially to its end. When it encounters clusters marked as dirty, the contents of these clusters are copied from the primary data set and sent to the secondary. This process is illustrated in FIG. 6 where the complete log is 601 (shown as 501 in FIG. 5). The synchronisation point is 605, with the intent log ending at 604 (which would be 506 in FIG. 5). The rest of the log is region 606 (in the previous FIG. 5, this is regions 503, 504, 505 and type flag 509). The region 602 before the synchronisation point 605 represents the region that has been synchronised with the replica. Any write to region 602 would be recorded in the cleaned transaction log (beginning from point 604) as an ordinary transaction and sent on to the replica. Any write to region 603 after the synchronisation point 605 would not be sent to the replica since it will be sent as soon as the synchronisation point sweeps over it; however, it would be recorded as a dirty cluster in the remaining intent log (if the cluster is not already dirty). Any completion signals from the replica for transactions in the transaction log will be handled in the usual fashion. Once the synchronisation point 605 has reached the end of the transaction log (604) then the replay is complete, the intent log regions 602 and 603 may be emptied and turned over for use by the transaction log. The conversion back to transaction log has now completed.

What is claimed is:

1. A computer system capable of replicating a primary volume of data to a replica volume, called a replication system, where:
   (a) all data transferred between a primary and replica volumes for a purpose of keeping a duplicate of the primary volume of data up to date are logged in a transaction log, and
   (b) transactions are removed from said transaction log after the replica volume signals that they are safely recorded, and
   (c) in response to a signal, the said transaction log is converted to an intent log which will subsequently be used by the said replication system, and
   (d) the intent log created in part (c) is converted back to a transaction log as part of a resynchronisation of data between the primary and replica volumes.

2. The computer system of claim 1 where the conversion from a transaction to an intent log is done while the replication system remains on-line and continues processing data.

3. A computer system capable of replicating a primary volume of data to a replica volume, called a replication system, where:

(a) all data transferred between a primary and replica volumes for a purpose of keeping a duplicate of the primary volume of data up to date are logged in a transaction log, and (b) transactions are removed from the transaction log created in part (a) after the replica volume signals that they are safely recorded, and (c) in response to a signal that the transaction log created in part (a) has filled up to a predetermined percentage of its total size, the said transaction log is converted to an intent log which will sub-sequently be used by the said replication system.

4. A method for converting from a transaction log to an intent log by sub-dividing a space occupied by the transaction log into regions where:

(a) the region of log space, called the intent log region, required for the intent log is identified, and (b) the region of log space, called a conversion region, required for a headers of a transaction entry currently residing in the intent log region is identified, and (c) all transaction log entries in the conversion region are compressed, freeing up a bodies of the transaction entries, and (d) transactions in the intent log region are compressed and moved to a empty data spaces in the conversion region formerly occupied by the bodies of the transaction entries that were freed in part (c), and (e) the intent log region is now cleared to represent a completely clean intent log, and (f) all transactions are replayed through the intent log to mark them as dirty in the intent log.

5. The method of claim 4 where the intent log region is not contained within the transaction log, but occupies space elsewhere.

6. The method of claim 4 where entries in the transaction log are not strictly contiguous but are separated into components.

* * * * *